US009926072B2

(12) United States Patent
Collins et al.

(10) Patent No.: US 9,926,072 B2
(45) Date of Patent: Mar. 27, 2018

(54) AEROSPACE COMPONENT AND METHOD FOR PRODUCING AN AEROSPACE COMPONENT

(71) Applicant: SAFRAN LANDING SYSTEMS UK LTD, Gloucester (GB)

(72) Inventors: Mark Collins, Cheltenham (GB); Marcin Chilik, Churchdown (GB)

(73) Assignee: SAFRAN LANDING SYSTEMS UK LTD (GB)

( * ) Notice: Subject to any disclaimer, the term of this patent is extended or adjusted under 35 U.S.C. 154(b) by 356 days.

(21) Appl. No.: 14/868,811

(22) Filed: Sep. 29, 2015

(65) Prior Publication Data

US 2016/0089721 A1 Mar. 31, 2016

(30) Foreign Application Priority Data

Sep. 30, 2014 (EP) .................... 14187086

(51) Int. Cl.
| | |
|---|---|
| B64C 25/22 | (2006.01) |
| B22F 3/24 | (2006.01) |
| B64C 25/00 | (2006.01) |
| B64C 25/18 | (2006.01) |
| B64C 25/60 | (2006.01) |
| B64C 25/62 | (2006.01) |
| B33Y 40/00 | (2015.01) |
| B22F 7/06 | (2006.01) |

(Continued)

(52) U.S. Cl.
CPC ............... *B64C 25/22* (2013.01); *B22F 3/24* (2013.01); *B22F 7/06* (2013.01); *B33Y 40/00* (2014.12); *B64C 25/00* (2013.01); *B64C 25/18* (2013.01); *B64C 25/60* (2013.01); *B64C 25/62* (2013.01); *B22F 3/1055* (2013.01); *B22F 2998/10* (2013.01); *B33Y 10/00* (2014.12); *B33Y 80/00* (2014.12); *Y02P 10/295* (2015.11)

(58) Field of Classification Search
CPC ......... B64C 25/18; B64C 25/22; B64C 25/60; B64C 25/62
See application file for complete search history.

(56) References Cited

U.S. PATENT DOCUMENTS

| | | | |
|---|---|---|---|
| 4,937,768 | A | 6/1990 | Carver |
| 5,705,117 | A | 1/1998 | OConnor |

(Continued)

FOREIGN PATENT DOCUMENTS

| | | |
|---|---|---|
| CN | 103350321 | 10/2013 |
| DE | 4001807 | 7/1991 |

(Continued)

OTHER PUBLICATIONS

European Search Report dated Mar. 11, 2015 for European Application No. 14187086.5.

*Primary Examiner* — Brian M O'Hara
(74) *Attorney, Agent, or Firm* — RatnerPrestia

(57) ABSTRACT

A method of forming an aerospace component, the method including: forming a first subcomponent by an additive layer manufacturing (ALM) process, the first subcomponent having an inner surface defining an inner space; performing a non-ALM machining process to modify a portion of the inner surface of the first subcomponent; and forming a second subcomponent by an ALM process, the second subcomponent being arranged to close the inner space to complete the component.

10 Claims, 2 Drawing Sheets

(51) Int. Cl.
    *B22F 3/105*    (2006.01)
    *B33Y 10/00*    (2015.01)
    *B33Y 80/00*    (2015.01)

(56) References Cited

U.S. PATENT DOCUMENTS

| | | | |
|---|---|---|---|
| 7,219,043 B2* | 5/2007 | Rebello | G05B 19/4097 |
| | | | 700/182 |
| 9,562,352 B2* | 2/2017 | Benthien | B64C 3/38 |
| 2003/0093173 A1 | 5/2003 | Farnworth | |
| 2003/0105538 A1 | 6/2003 | Wooten | |
| 2004/0021256 A1 | 2/2004 | DeGrange | |
| 2004/0141018 A1 | 7/2004 | Silverbrook | |
| 2005/0074511 A1 | 4/2005 | Oriakhi | |
| 2008/0118665 A1 | 5/2008 | Slaughter | |
| 2010/0019084 A1 | 1/2010 | Sisk | |
| 2010/0314794 A1 | 12/2010 | Dietrich | |
| 2011/0311389 A1 | 12/2011 | Ryan | |
| 2013/0101728 A1 | 4/2013 | Keremes | |
| 2014/0202479 A1* | 7/2014 | Nicholls | A24D 3/048 |
| | | | 131/337 |
| 2015/0013819 A1* | 1/2015 | Stewart | B64C 1/00 |
| | | | 138/109 |
| 2015/0322820 A1* | 11/2015 | Ott | F01D 25/24 |
| | | | 415/208.1 |
| 2016/0151977 A1* | 6/2016 | Burd | G05B 19/4099 |
| | | | 700/98 |
| 2016/0175932 A1* | 6/2016 | Dimter | B22F 3/1055 |
| | | | 419/28 |
| 2016/0238324 A1* | 8/2016 | Butcher | B29D 23/00 |

FOREIGN PATENT DOCUMENTS

| | | |
|---|---|---|
| EP | 2682207 | 1/2014 |
| FR | 2979817 | 3/2013 |
| WO | 2013160188 | 10/2013 |

* cited by examiner

AEROSPACE COMPONENT AND METHOD FOR PRODUCING AN AEROSPACE COMPONENT

This application claims the benefit of European Application No. EP 14187086.5, filed on Sep. 30, 2014, which is incorporated by reference herein in its entirety.

BACKGROUND OF THE INVENTION

An aerospace component is a component designed to form part of an aircraft or spacecraft. Such components are therefore designed and manufactured to a high level of precision. Components often including subcomponents that move relative to one another.

In conventional machining and assembly processes, subcomponents are individually formed and then assembled into the aerospace component. For example, subcomponents can be formed by conventional processes such as casting or forging, often supplemented by additional subtractive manufacturing processes such as milling, cutting, turning and sawing. Such processes are well established and can produce a subcomponent that has good mechanical properties and surface finish.

However, the present inventors have identified that known methods for producing an aerospace component can have one or more of the following disadvantages:
- the subcomponents are often designed to suit the method of assembly, which can result in a sub-optimal design for their intended function;
- connection interfaces between sub components can lead to points of weakness such as stress raisers; and
- components can be overly complex and/or time consuming to manufacture.

SUMMARY OF THE INVENTION

A first aspect of the invention provides a method of forming an aerospace component, the method including: forming a first subcomponent by an additive layer manufacturing (ALM) process, the first subcomponent having an inner surface defining an inner space; performing a non-ALM machining process to modify a portion of the inner surface of the first subcomponent; and forming a second subcomponent by an ALM process, the second subcomponent being arranged to close the inner space to complete the component.

Thus, the first aspect provides a method including ALM steps interspersed with one or more conventional machining processes. This enables internal surfaces of ALM produced subcomponents to be provided with precision surface finishes that presently cannot be achieved by ALM due to printing resolution, while at the same time enabling a component to be additively manufactured. Put another way, the machining process enables the ALM produced inner surface to be made relatively smooth. The design of the component can be simplified due to removal of the requirement for complex subassembly connection interfaces, such as threaded surfaces, which can define points of weakness in existing aerospace components. Also, the design of the subcomponents can be simplified. Thus, the first aspect enables aerospace components to be manufactured more efficiently than can be achieved by existing methods.

Prior to forming the second subcomponent, the method can include one or more of the following steps:
providing a non-ALM subcomponent and attaching it to an ALM subcomponent;
providing a non-ALM subcomponent and movably mounting it within the internal space; and
forming one or more further ALM subcomponents coupled directly or indirectly to the first subcomponent. The sub components can be net shape or near net shape.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
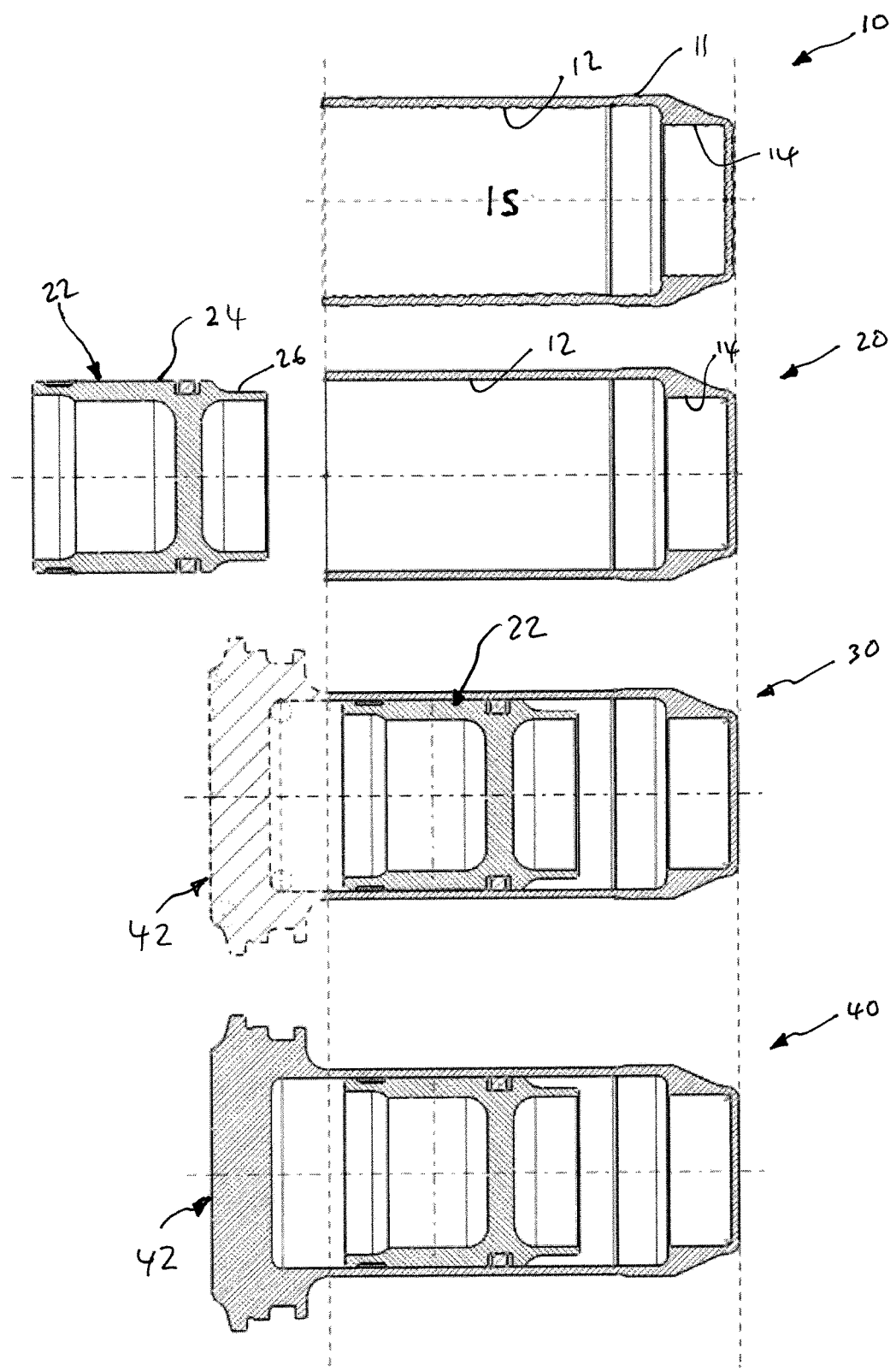
FIG. 1 illustrates a method according to an embodiment of the present invention.

FIG. 1 illustrates a method of forming an aerospace component according to an embodiment of the invention. The aerospace component in this embodiment is an aircraft landing gear assembly shock absorber; however, for ease of understanding, a number of subcomponents have been omitted and others have been simplified. A person skilled in the art will however be capable of applying this general teaching to the manufacture of other aerospace components, such as aircraft assembly components, using methods according to embodiments of the present invention.

Methods according to embodiments of the invention include steps of forming subcomponents by an additive layer manufacturing (ALM) process. Any suitable ALM process can be used to produce subcomponents; for example, direct metal laser sintering. At step 10 a first subcomponent 11 is formed by an ALM process. The first subcomponent 11 is a cup-like part that defines a body of the shock absorber, having a closed end region. However, in other embodiments the subcomponent 11 can be any shape that has an inner surface that is inaccessible when the aerospace component is completed, meaning that the inner surface cannot be subjected to a conventional machining operation following completion of the aerospace component.

The first subcomponent 11 is hollow so as to define an internal space IS, and has first 12 and second 14 axially spaced inner surface portions of differing diameters. The first subcomponent 11 is arranged in use to slidably house a piston 22. However, the inner surface portions 12, 14 are relatively rough due to printing resolution of the ALM process.

Thus, at step 20 the method includes performing a machining process such as milling to smoothen the inner surface portions 12, 14 such that the inner surface portions 12, 14 correspond to first 24 and second 26 axially spaced outer surface portions of the conventionally produced piston 22 such that the piston 22 can slide freely within the first subcomponent 11.

At step 30 the piston 22 is introduced into the internal space IS and thereafter, at step 40, a second subcomponent 42 is formed by an ALM process in order to close the inner space IS, completing the aerospace component. In practice, the piston 22 may be coupled to a tube which extends through an opening in the second subcomponent 42.

The term 'close' can mean making the inners surface portion(s) inaccessible or in some cases difficult to access for the purpose of performing a conventional machining process.

Figure 2:
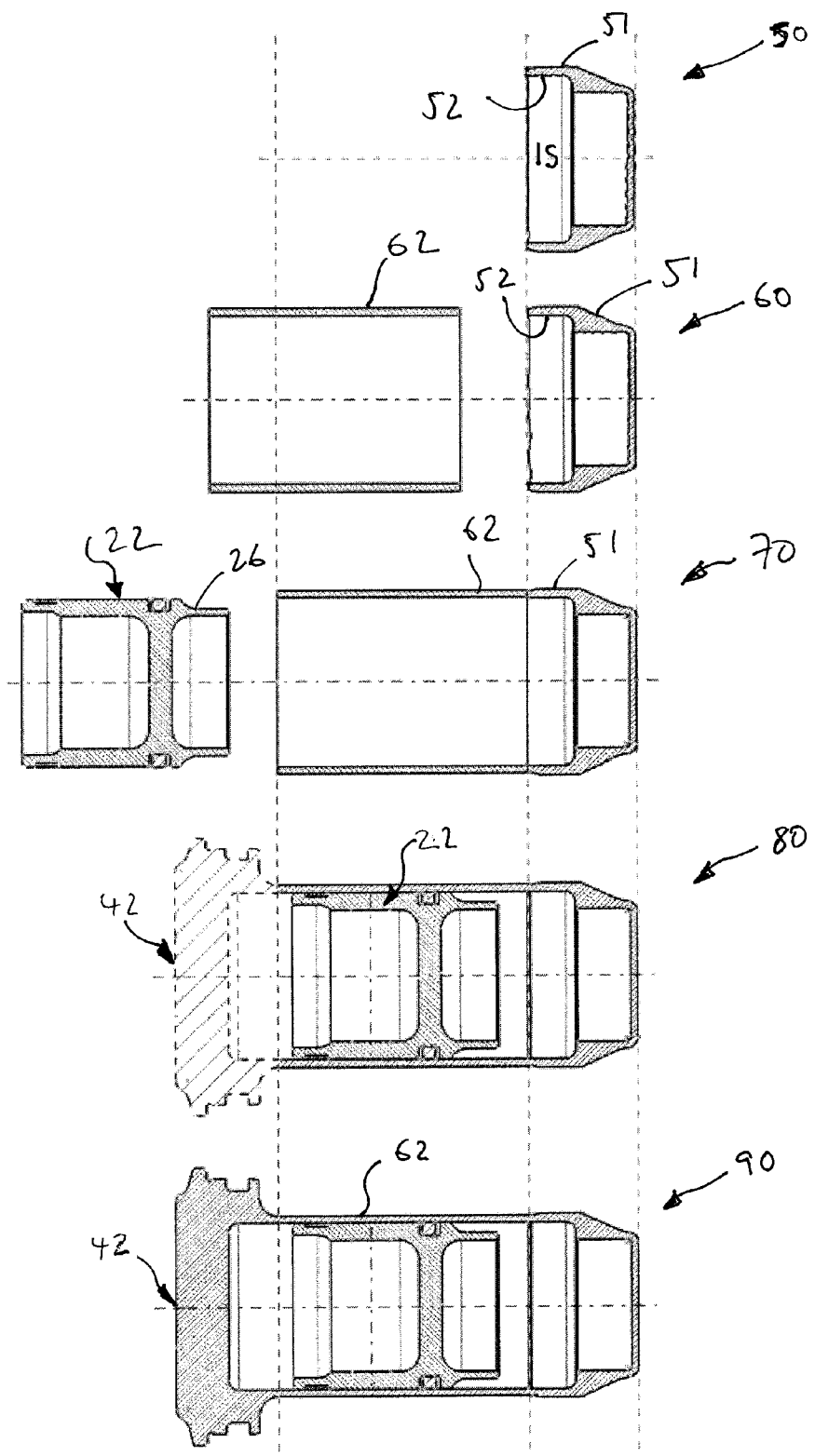
FIG. 2 illustrates a method according to a further embodiment of the present invention.

Referring to FIG. 2, a method according to a further embodiment of the invention includes at step 50 forming a first subcomponent 51 by an ALM process. The first subcomponent 51 defines an end of the shock absorber.

The first subcomponent 51 is hollow so as to define an internal space IS, and has a first 52 inner surface portion arranged to slidably cooperate with the end region surface 26 of a conventional piston 22. However, the inner surface portion 52 is relatively rough due to printing resolution.

Thus, at step 60 the method includes performing a machining process such as milling to smoothen the inner surface portion 52 such that the inner surface portion 52 corresponds to end region surface 26 of the piston 22. Also, a section of hollow tubing 62 is provided to form the body of the shock absorber, which defines the majority of the internal space IS.

At step 70 the section of hollow tubing 62 is axially joined to the first subcomponent 51 by welding or the like.

At step 80 the piston 22 is inserted into the internal space IS and thereafter, at step 90, a second subcomponent 42 is formed by an ALM process in order to close the inner space IS, completing the component.

Embodiments of the invention therefore include ALM steps interspersed with one or more conventional machining processes. This enables accuracy and surface finish requirements to be obtained that presently cannot be achieved by ALM due to printing resolution. Put another way, the machining process enables the ALM produced inner surface to be made relatively smooth. The design of the component can be simplified due to removal of the requirement for complex subassembly connection interfaces, such as threaded surfaces, which can define points of weakness in existing aerospace components. Also, the design of the subcomponents can be simplified. Thus, embodiments of the invention enable aerospace components to be manufactured more efficiently than can be achieved by existing methods.

In some embodiments the component does not include a moving part; for example, the machining operation may be performed to provide smooth internal surfaces for the passage of fluid.

The ALM produced subcomponents can comprise metal; for example, titanium alloy, steel, stainless steel, aluminium or copper. Non-ALM subcomponents can take any suitable form.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A method of forming an aerospace component, the method comprising:
   forming a first subcomponent by an additive layer manufacturing (ALM) process, the first subcomponent having an inner surface defining an inner space;
   performing a non-ALM machining process to modify a portion of the inner surface of the first subcomponent;
   providing a first non-ALM produced subcomponent within the inner space, the first non-ALM produced subcomponent being slidably mounted within the inner space;
   forming a second subcomponent by an ALM process, the second subcomponent being arranged to close the inner space to complete the component; and
   forming an aerospace shock absorber or aerospace actuator from the first subcomponent, the first non-ALM produced subcomponent and the second subcomponent.

2. A method according to claim 1, whereby prior to the step of forming the second subcomponent, the method includes forming a third subcomponent by an ALM process, the third subcomponent being coupled to another subcomponent of the aerospace component.

3. A method according to claim 1, whereby prior to the step of forming the second subcomponent, the method includes providing a second non-ALM produced subcomponent having an inner surface arranged to define an inner space, and coupling the second non-ALM produced subcomponent to the first subcomponent.

4. A method according to claim 1, whereby prior to the step of forming the second subcomponent, the method includes performing one or more further non-ALM machining processes to modify one or more portions of an inner or connecting surface of a subcomponent.

5. The method according to claim 1, whereby the aerospace component comprises an aircraft assembly component.

6. The method according to claim 5, whereby the aircraft assembly component comprises an aircraft landing gear component.

7. An aerospace component comprising:
   a first subcomponent having an additive layer structure formed by an additive layer manufacturing (ALM) process the first subcomponent having an inner surface defining an inner space;
   a first non-ALM produced subcomponent slidably mounted within the inner space;
   a second subcomponent having an additive layer structure, the second subcomponent being arranged to close the inner space to complete the component,
   wherein a portion of the inner surface has a relatively smooth surface profile in comparison to an outer surface profile of the additive layer structure of the first and/or second subcomponent; and
   wherein the first subcomponent, the first non-ALM produced subcomponent and the second subcomponent form an aerospace shock absorber or aerospace actuator.

8. An aerospace component according to claim 7, wherein the aerospace component comprises an aircraft assembly component.

9. An aerospace component according to claim 8, wherein the aircraft assembly component comprises an aircraft landing gear component.

10. A method of forming an aerospace component, the method comprising:
    forming a first subcomponent by an additive layer manufacturing (ALM) process, the first subcomponent having an inner surface defining an inner space;
    performing a non-ALM machining process to modify a portion of the inner surface of the first subcomponent;
    forming a second subcomponent by an ALM process, the second subcomponent being arranged to close the inner space to complete the component,
    whereby prior to the step of forming the second subcomponent, the method includes providing a first non-ALM produced subcomponent within the inner space and whereby the first non-ALM produced subcomponent is slidably mounted within the inner space; and forming an aerospace shock absorber or aerospace actuator from the first subcomponent, the first non-ALM produced subcomponent and the second subcomponent.

\* \* \* \* \*